United States Patent [19]
Corradi et al.

[11] Patent Number: 5,477,638
[45] Date of Patent: Dec. 26, 1995

[54] METHOD AND DEVICE FOR INTRODUCING LIQUID SUBSTANCES INTO THE TRUNK OF A PLANT

[76] Inventors: Bruno Corradi; Wolfango Corradi, both of Via Boccaccio, 25; Mauro Corradi, Vicolo del Teatro, 11, all of Fidenza, Italy, 43036

[21] Appl. No.: 166,258

[22] Filed: Dec. 13, 1993

[30] Foreign Application Priority Data

Dec. 14, 1992 [IT] Italy .................................. PR92A0051

[51] Int. Cl.⁶ .................................................. A01G 29/00
[52] U.S. Cl. .......................................................... 47/57.5
[58] Field of Search ............................... 47/57.5; 604/251

[56] References Cited

U.S. PATENT DOCUMENTS

| | | | |
|---|---|---|---|
| 952,245 | 5/1910 | Gardner | 47/57.5 |
| 1,718,195 | 6/1929 | Rankin | 47/57.5 |
| 3,340,871 | 9/1967 | Jellies | 604/251 |
| 3,864,874 | 2/1975 | Norris | 47/57.5 |
| 4,112,617 | 9/1978 | Purviance . | |
| 4,144,673 | 3/1979 | Quast et al. . | |
| 4,248,223 | 2/1981 | Turner | 604/251 |
| 4,989,366 | 2/1991 | DeVlieger . | |

FOREIGN PATENT DOCUMENTS

| | | | |
|---|---|---|---|
| 0226718 | 7/1987 | European Pat. Off. . | |
| 2509123 | 1/1983 | France | 47/57.5 |
| 677364 | 8/1952 | United Kingdom | 47/57.5 |
| 1466743 | 3/1977 | United Kingdom | 47/57.5 |

OTHER PUBLICATIONS

The Washington Daily News Saturday Dec. 31, 1960.

*Primary Examiner*—Henry E. Raduazo
*Attorney, Agent, or Firm*—Lerner, David, Littenberg, Krumholz & Mentlik

[57] ABSTRACT

A device for the introduction of a liquid substance into the trunk of a plant comprises a sealed container connected to one or more distribution ducts by means of at least an outlet duct. Along the circuit there are provided means to regulate and means to detect the flow rate of the substance towards truncated-cone injection needles inserted into appropriate holes in the plant's trunk. The method according to the invention involves the use of said device to allow the introduction of the treating substance into the layer of the xylem involved in the ascending vascular circulation of the plant.

12 Claims, 4 Drawing Sheets

METHOD AND DEVICE FOR INTRODUCING LIQUID SUBSTANCES INTO THE TRUNK OF A PLANT

BACKGROUND OF THE INVENTION

1. Field of the Invention

The present invention concerns a method and a device for the treatment of a plant by means of the introduction of liquid substances into its trunk.

The treatments for the conservation of the arboreal heritage require the more and more widespread use of chemical products of very different nature and with different aims, for instance phytodrugs, pesticides, fertilizers or similar.

These compounds, often applied by dusting or radical absorption, can be dangerous for the entire ecosystem in the area where the treatment is carried out.

Systems for the application of chemical substances have been recently proposed and they envisage the injection under pressure of said substances directly into the system of the plant lymph circulation.

Such methods of treatment, due to an injection pressure exceeding the physiological pressure of the vascular system, prevent the homogeneous distribution of the substance in the whole plant. In the best case this can only result in a poor efficacy of the treament, whereas in the worst case the high concentration in localised areas can cause severe damages to the treated plant. However, the French patent application N FR 2586162 has disclosed a process for the treatment of plants by means of introduction at atmospheric pressure of an antibacterial substance in the trunk. The device used for the application of the process described comprises a container of relatively limited capacity (15 cc) and two tubes connected to opposite ends thereof. The tube coming out from the bottom portion is introduced with its free end into a hole provided in the tree at a lower height than the container, while the second tube, the function of which is not clearly described, probably connects the inside of the container to the external atmosphere. One of the major inconveniences of the device described in the aforesaid French patent application lies in the impossibility to regulate the substance deflux from the container. In practice, any substance present in the container downflows in few instants towards the introduction hole, thus preventing to comply with the prescribed dosage which varies as a function of multiple factors, such as for instance the species of the treated plant, its size, the type of substance used to carry out the treatment and the concentration of active principles therein.

Furthermore a similar device proves to be poorly suitable in case it is necessary to perform a series of repeated treatments. In fact the device presented in said French patent application cannot be used again after the treatment and it is therefore necessary to utilize more devices if a different substance or massive doses of the same substance need to be introduced.

OBJECTS OF THE INVENTION

An object of the present invention is that of envisaging a device and a method to perform the introduction of liquid substances into the trunk of a plant capable of overcoming the inconveniences of the known technique.

Another object of the present invention is that of envisaging a device and a method for the introduction of liquid substances into the trunk of a plant that allows a correct application of the treatment as a function of the characteristics of the plant and of the substance used. A further object of the present invention is that of envisaging a device and a method to perform the introduction of liquid substances into the trunk of a plant that allows the use of any type of substance avoiding any contamination of the surrounding environment.

SUMMARY OF THE INVENTION

These objects are achieved by means of the present invention that concerns a device for the introduction of a liquid substance into the trunk of a plant, of the type comprising a sealed container containing said substance, at least an outlet duct connected at one end to said container and one or more distribution ducts in fluid communication with said outcoming duct, each of said distribution ducts being provided at its own free end with a needle for the injection of said substance into the trunk of the plant, characterized by the fact of comprising means to regulate and means to detect the flow rate of said substance introduced into the trunk of the plant.

The invention also concerns a method for the introduction of a liquid substance into the trunk of a plant, characterized by the fact of envisaging the introduction of said substance into the vascular system of the plant, through one or more holes provided in the trunk, by means of a device comprising a sealed container containing said substance and positioned at a higher height than that of said holes, at least an outlet duct connected at one end to said container and one or more distribution ducts in fluid communication with the other end of said outlet duct, each of said distribuction ducts being provided at its own free end with a needle suitable for being inserted into one of said holes, as well as means to regulate and means to detect the flow rate of said substance introduced into the trunk of the plant.

It is thus possible to adjust the treatment in compliance with the foreseen dosage as a function of the characteristics of each plant and the characteristics of the substance used. This fact allows to respect the plant physiological capacity of absorption and makes the treatment more effective versus treatments of known type. Possible damages to the plant due to the imperfect distribution of the substance as well as possible pollution of the surrounding environment are thus avoided. These and other advantages will become more evident from the following description, given by way of illustration and not with limiting purposes, with reference to the accompanying drawings, where:

DESCRIPTION OF THE PREFERRED EMBODIMENTS

Figure 1:
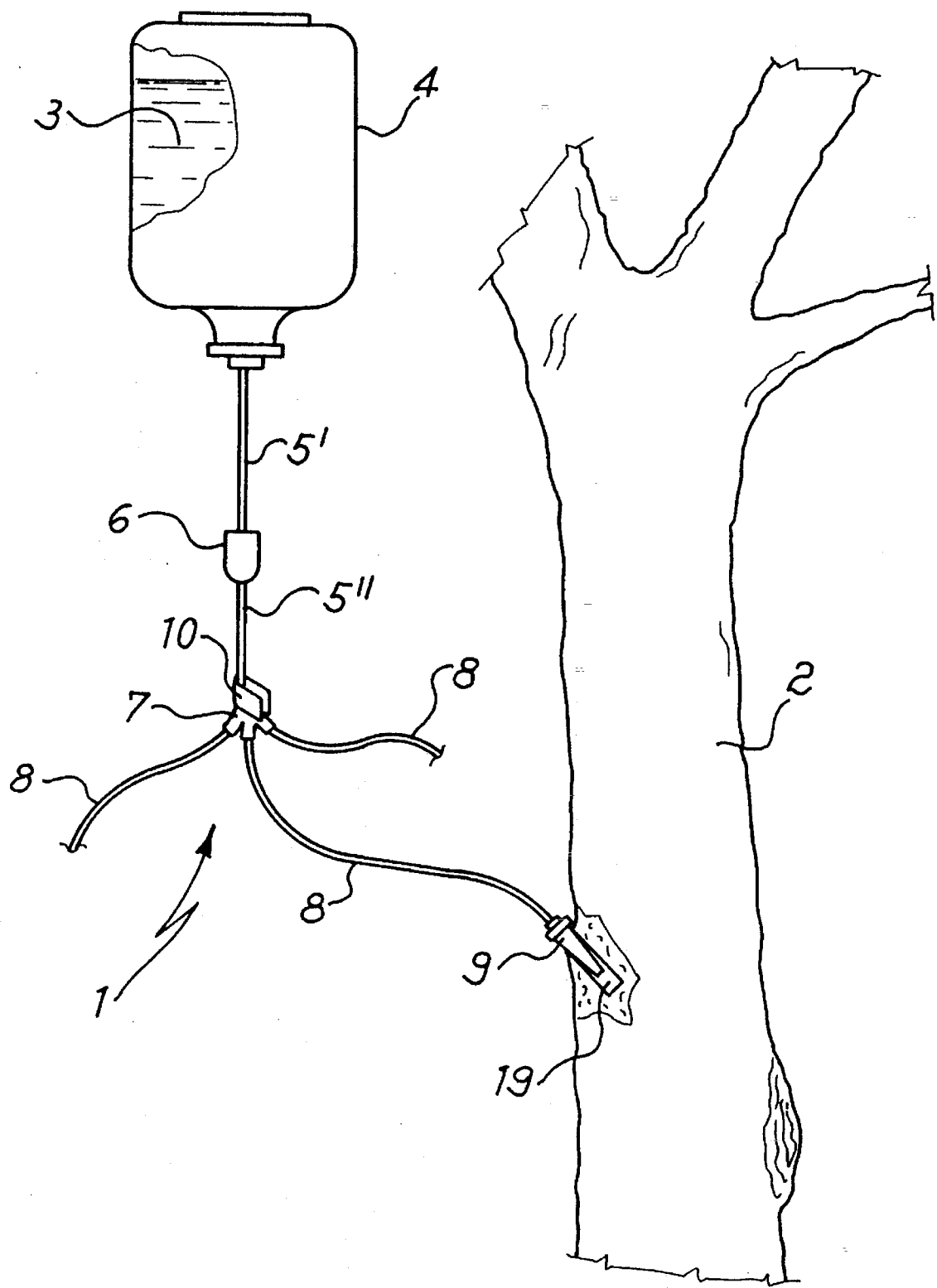
FIG. 1 is a schematic view of a device according to the invention during the application of the treatment to a plant.
Figure 2:
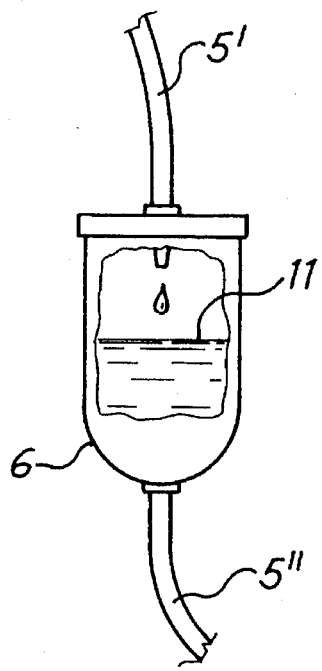
FIG. 2 is a magnified view of a detail of the flow detecting means in the device of FIG. 1.

FIG. 1 schematically illustrates a device 1 for the introduction of a liquid substance into the trunk of a plant 2. The device 1 comprises a sealed container 4 wherein a liquid substance 3 used for the treatment is contained. Downstream of the container 4 a dripper or regulating arrangement 6 is having a drip rate compatible with its intended use for trees is connected by means of a first length 5' of an outlet duct. The dripper or regulating arrangment 6, better visible in the magnified view of FIG. 2, is constitued by an envelope housing a dripping chamber, and comprises at least a transparent portion allowing to detect the flow rate of the substance 3 coming out of the container 4 and the level 11 of the substance in the dripper itself.

Again with reference to FIG. 1, the second length 5" of the outlet duct placed downstream of the dripper 6 is connected in fluid communication by means of a multiple-way joint 7 to a plurality of distribution ducts 8. FIG. 1 represents three distribution ducts 8, but it is well understood that more or less ducts may be foreseen, for instance even a single one (in this case the ducts 5" and 8 could be obtained as a single piece), mainly as a function of the plant diameter or of the characteristics of the treatment or the substance used.

The length 5" of the outlet duct is made, at least for a portion thereof, of flexible material to allow the regulation of the flow of the substance 3 thanks to the variation of its section due to the action of suitable regulating means 10.

Figure 3A:
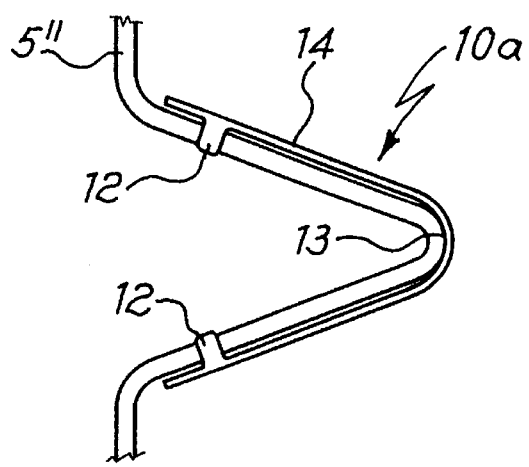
FIG. 3A and 3B are magnified views of the flow regulating means usable with the device of FIG. 1.

FIG. 3A shows a clamp 10a that is secured to the length 5" of the outlet duct, for instance by means of a couple of tabs 12. The clamp 10a, preferably made of plastically deformable material, allows to bend the duct on which it is inserted in a way to narrow the section of the duct itself in correspondence to the point 13 that follows the corresponding course along the deformable plate 13 of the clamp 10a.

Figure 3B:
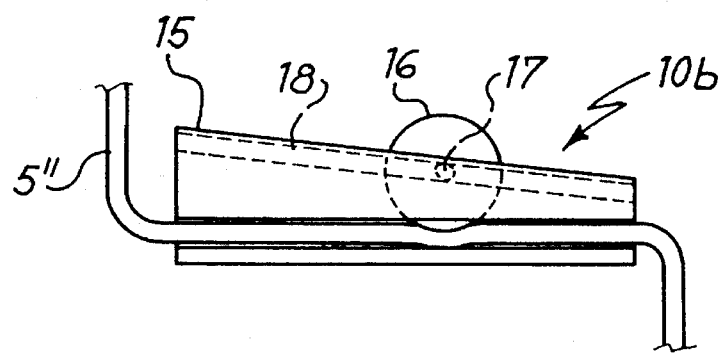

FIG. 3B shows other flow regulating means 10b consisting of a body having trapezoidal section crossed by the flexible duct 5". Along the inclined side 15 of the trapezoidal body there is provided a sliding cursor constituted for instance by a small wheel 16 fixed on a pivot 17, the latter being slidably constrained in a groove 18 parallel to the inclined side 15. The sliding or rolling of the wheel 16 along the inclined side 15 allows to gradually vary the section of the duct 5" that crosses the body 15 of the regulator 10b and consequently vary the flow rate towards the distribution ducts 8.

It is well understood that the regulating means 10a and 10b represent a simple and economic solution for the realisation of the device according to the invention. Other flow regulating means, such as for instance taps or the like, can be used instead of the regulating means 10a and 10b without escaping from the scope of the present invention.

The flowrate detecting means 6 and regulating means 10 provide the device 1 with better flexibility, adapting it to the different application requirements of treatments and simultaneously allowing the compliance with the plant physiological properties of absorption of any substance. Now looking at FIG. 1 again, each of the distribution ducts 8 is provided at its own free end with a needle 9 for the injection of the substance 3 into the trunk of the plant 2 through a cylindrical hole 10 that is provided in the plant.

It is convenient to notice that the device 1 according to the present invention can also be used again, at the most only replacing the container 4 if further doses of the same substance need to be introduced or if a different substance is to be used for the same plant.

Figure 4:
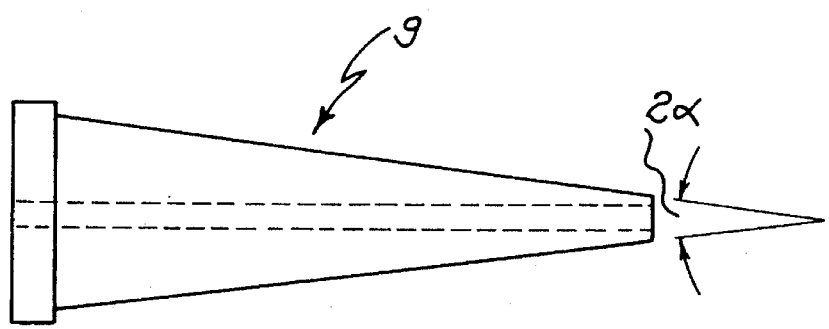
FIG. 4 is a magnified view of a needle used for the introduction of the substance according to the invention.

FIG. 4 shows a magnified view of a needle 9 that, at least in its tail portion, has a truncated cone shape. According to a preferential feature of the invention the pitch angle α of the right circular cone built on the tail portion of the needle 9 is exceeding 2 degrees.

This allows to avoid that the external surface of the needle 9 obstructs the surface portions of the plant's internal layers involved in the ascending lymph circulation, thus leaving an appropriate space for the substance 3 to accumulate in the hole 19.

The method for the treatment of a plant proposed by the present invention envisages the introduction of a substance into the plant vascular system, through one or more holes provided in the trunk, by means of the aforedescribed device 1, arranging the container 4 at a height exceeding that of said holes in a way to allow the deflux by gravity of the substance 3 towards each of the needles 9.

Figure 5:
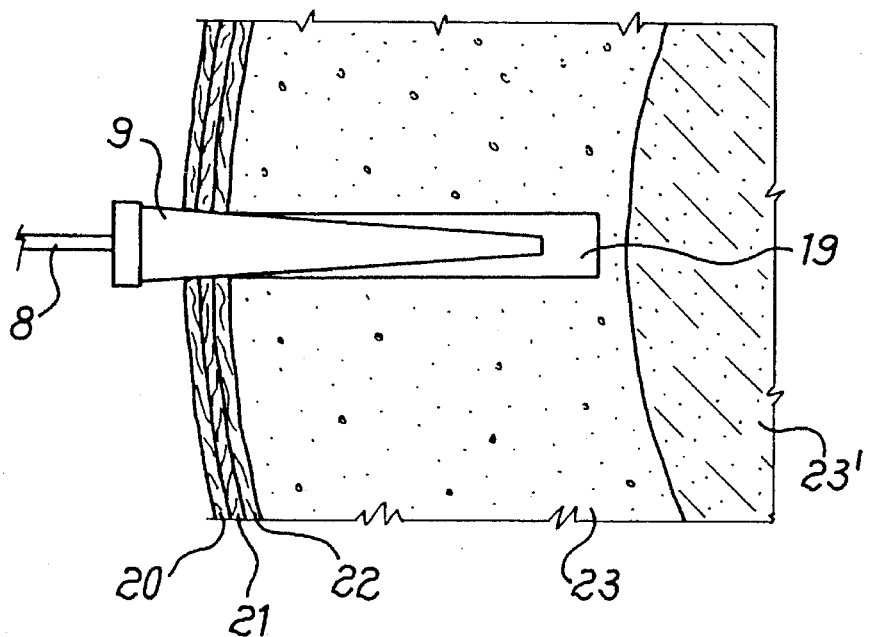
FIG. 5 is a cross sectional magnified view of a plant submitted to a treatment according to the method of the present invention.
Figure 6:
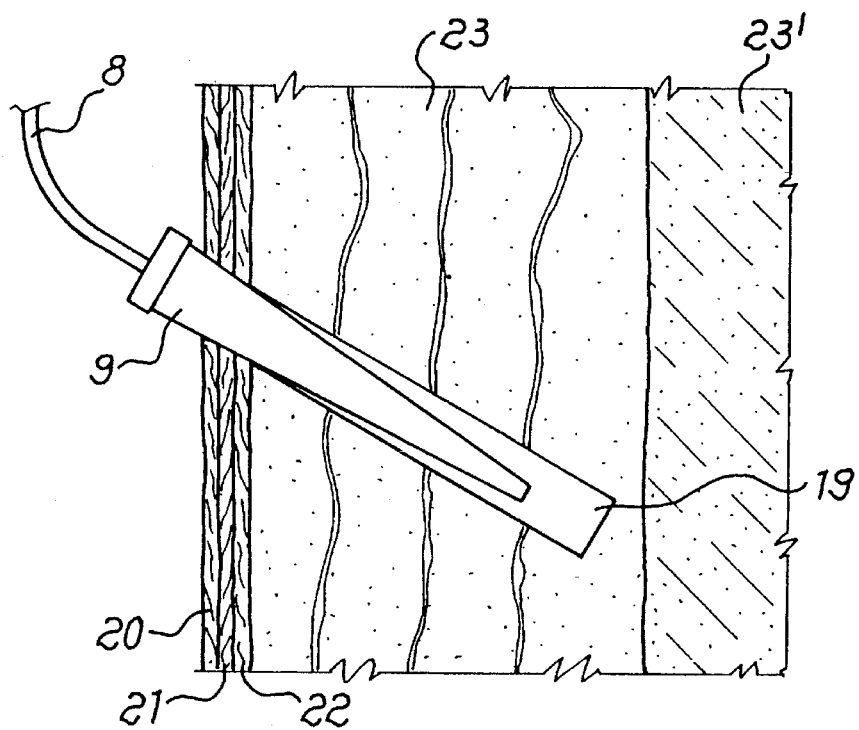
FIG. 6 is a view in longitudinal section of a plant submitted to a treatment according to the method of the present invention illustrated in FIG. 5.

FIG. 5 represents a portion of trunk in cross section in correspondence to a hole 19 into which the needle 9 is inserted. The hole 19 has circular cross section, with diameter ranging between the minimum and maximum diameter of the needle 9, and goes through the most external layers of the trunk, namely the bark 20, the phloem 21 and the cambium 22 up to involve the xylem layer 23 wherein the plant ascending lymph circulation takes place.

The hole can also penetrate for a certain depth as far as the supporting structure of the plant constituted by the xylem 23' that is no longer involved, or that is still involved to a minimum extent, in the ascending lymph circulation. This allows to exploit the entire effective surface of absorption in the hole 19 communicating with the vascular system of the plant.

In particular, the needle 9 of conical shape and the walls of the circular hole 19 allow to obtain a chamber of accumulation for the introduced substance. The pitch angle of the right circular cone built on the truncated cone portion of the needle 9 is exceeding 2 degrees so as to avoid the obstruction of the internal surface of said accumulation chamber in correspondence with the xylem 23. As illustrated in the view in longitudinal section of FIG. 5, the hole 19 is preferably provided with inclined axis in respect to the direction normal to the trunk surface in the point of drilling. This allows to obtain a larger surface of absorption in correspondence to the xylem 23 with equal depth of the hole 19.

Figure 7:
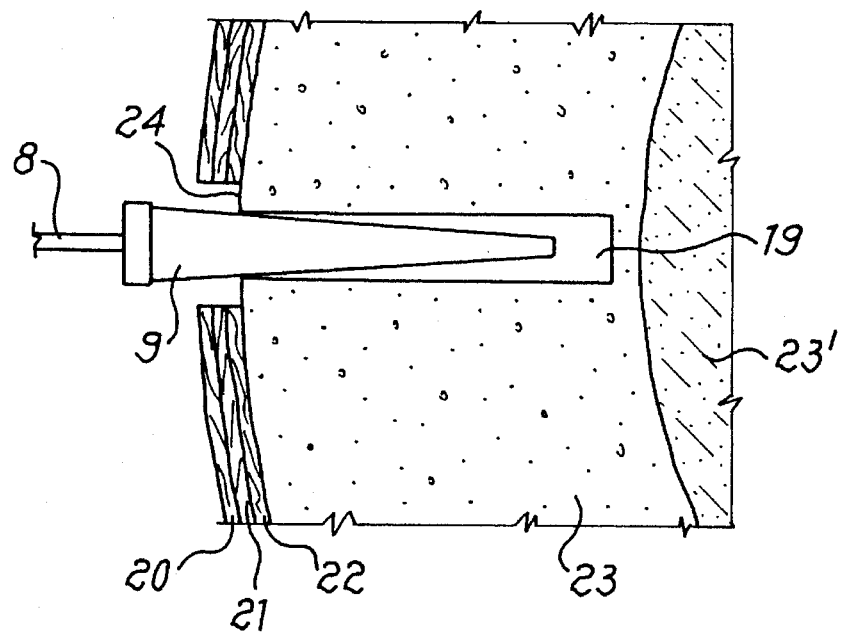
FIG. 7 is a cross sectional magnified view of a plant submitted to a second type of treatment according to the method of the present invention.
Figure 8:
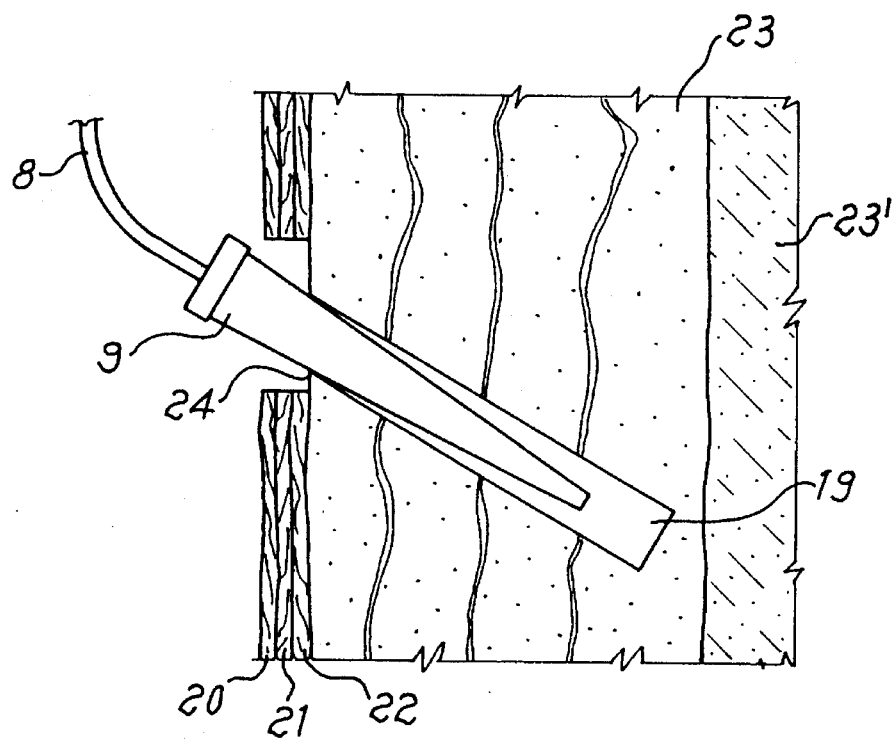
FIG. 8 is a view in longitudinal section of a plant submitted to a second type of treatment according to the method of the present invention illustrated in FIG. 7.

FIGS. 7 and 8 illustrate a variant of application of the method that involves the removal of the layers of vegetal tissue superimposed to the xylem 23 in correspondence to the hole 19.

In particular layers 20, 21, 22 are removed in a way that the external border 24 of the hole 19 overcomes the layer of the cambium 22. This variant of the method allows to avoid the possible absorption of the introduced substance by the cambium layer 22.

The latter is a very delicate layer that could be damaged by the absorption of certain substances, in particular strongly acid substances, since it constitutes the layer under development of the vegetal tissue.

A few examples are now described herebelow not limiting the application of the method according to the invention.

EXAMPLE 1

The treatment has been applied to a plane tree, having the trunk diameter of about 35 cm, that was infested by Corythuca ciliata; infestation before the application had been estimated by sampling as 15 adults and several "neanic insects" (pupal stage) for each leaf.

In the trunk, at approximately 120 cm from the base, two holes were made 3.8 mm in diameter in diametrically opposite positions, by means of a common drill with tip previously disinfected on fire. The holes, with axes downwards, were approximately 4 cm deep. In order to avoid the absorption of the substance by the cambium, the removal of the layers superimposed to the xylem was carried out by taking away a portion concentric to the hole by means of a hollow punch with diameter of approximately 10 mm.

A bag of plastic material containing 350 cc of 10% solution of a Ist class insecticide (Kilval; Rhone-Poulenc Agro registered trademark) was suspended to the trunk. Two outlet ducts 3 mm in diameter were connected to the bag, each provided with a dripper (or defluxer), with a flow regulating clamp and with a truncated cone needle 5 cm long with diameters more and less than 5 mm and 1 mm respectively. The two needles were inserted as far as to completely engage the holes mouths and then the clamps for the deflux regulation were opened. The absorption by the plant has resulted in the complete emptying of the bag within approximately 16 minutes.

Once the needles removed, the holes were closed by injecting silicone until their complete closure and the covering of the removed vegetal tissue.

Infestation was then assessed after three days detecting the presence of an adult every six leaves and a reduced number of neanic insects, whereas after one week the presence of an adult every seven leaves and the substantial absence of neanic insects were found. On witness trees, on the contrary, the constant presence of adults and neanic insects in evolution was detected. On a subsequent control, performed after approximately two months, the treated plant showed leafage in full efficiency and a negligible presence of insects, unlike witness plants that, though presenting a seriously damaged leafage, showeed the presence of a large number of adults in full activity.

EXAMPLE 2

As in example 1, the treatment was applied to a plane tree with diameter of the trunk of about 50 cm, that was infested by Corythuca ciliata.

The procedure was the same as in the previous example, but three equidistant holes were made along the circumference of the trunk at a height of approximately 120 cm from the base.

A bag of plastic material containing 500 cc of 10% solution of Metasystox (Bayer registered trademark) was suspended to the trunk. Only one outlet duct was connected to the bag, provided with a dripper (or defluxer) and with a flow regulating clamp and placed in fluid communication with the three distribution ducts by means of a three-way joint.

The absorption by the plant resulted in the complete emptying of the bag within approximately 14 minutes. The results were substantially the same as in the previous example.

The method therefore allows to perform treatments limited to a particular plant without contaminating the surrounding ecosystem, thus allowing to use effective products that however could not be applied by other systems because of their toxicity or their noxiousness. This is particularly important in the case of treatments that must be performed in urban agglomerations where the application of the same substances using systems of known type would result highly noxious to man health.

Furthermore, by using an introduction device according to the invention, it is possible to treat a plant simultaneously respecting its physiological limits of absorption of the substance to be used.

We claim:

1. A method of introducing a liquid substance into a trunk of a plant by means of a device, comprising:

a container receiving said liquid substance, a duct assembly having an outlet duct connected to said container and at least one distribution duct, said at least one distribution duct having a needle provided at an end thereof remote from said outlet duct, said method comprising the steps of:

(a) forming at least one hole having an outer periphery within said trunk of the plant, so that a layer of vegetative tissue situated exterior 10 the xylem being removed substantially beyond said outer periphery;

(b) inserting said needle into said at least one hole;

(c) positioning said container at a level higher than a level of said at least one hole and inserting said needle into said hole; and (d) regulating said flow of said liquid substance while said liquid substance being introduced into said trunk by a detecting and flow regulating device having a predetermined flow rate, so that a uniform flow rate of said liquid substance is maintained independently of a level of the liquid in said container.

2. The method of claim 1, wherein said layer of vegetative tissue consists of the bark, the phloem and the cambium.

3. The method of claim 1, wherein in said steps (a), (b) and (c) said needle is inserted into said at least one hole so as to form a fluid seal with said trunk without contacting said layer of vegetative tissue.

4. The method of claim 3, wherein said vegetative layer is chosen from the group comprising the bark, the phloem and the cambium.

5. The method of claim 3, further comprising said hole having an outer periphery and said layer of vegetative tissue including the bark, the phloem and the cambium, wherein said layer of vegetative tissue being removed substantially beyond said outer periphery of said hole.

6. The method of claim 1, wherein said regulating arrangement is capable of adjusting a cross-section of said outlet duct.

7. The method of claim 1, wherein said regulating arrangement is a dripping chamber connected to said outlet duct.

8. The method of claim 7, wherein said dripping chamber comprises an envelope, at least a portion of said envelope is transparent, said step (d) further comprises inspecting of a dripping rate and the level of the liquid substance within the dripping chamber.

9. The method of claim 3, wherein in said steps (a), (b) and (c) to facilitate formation of said seal an angle of the cone of said conic shape needle exceeds 2°.

10. The method of claim 3, wherein said at least one hole has a substantially circular cross-section with a diameter ranging between minimum and maximum diameters of said cone-shaped needle and said hole having a depth sufficient to reach the layer of xylem involved in ascending vascular circulation of said plant.

11. The method of claim 1, wherein in said steps (a), (b) and (c) an accumulation chamber being formed by a wall of said hole and said needle engaging said hole, said accumulation chamber includes a portion of said xylem involved in the ascending vascular circulation of the plant.

12. The method of claim 1, wherein in said step (a) said at least one hole being formed with a longitudinal axis inclined with respect to the direction normal to the trunk of the plant at a point of drilling of said hole.

* * * * *

UNITED STATES PATENT AND TRADEMARK OFFICE
CERTIFICATE OF CORRECTION

PATENT NO. : 5,477,638
DATED : December 26, 1995
INVENTOR(S) : Bruno Corradi; Wolfgango Corradi; Mauro Corradi It is certified that error appears in the above-identified patent and that said Letters Patent is hereby corrected as shown below:

[30], Delete "PR92A0051" and insert therefor --PR92A000051--.

Column 6, line 19, delete "10", and insert therefor --to--.

Signed and Sealed this

Ninth Day of April, 1996

Attest:

BRUCE LEHMAN

Attesting Officer

Commissioner of Patents and Trademarks